Oct. 11, 1932.   H. B. SIEMS   1,882,196
DEVICE FOR MEASURING LIQUIDS
Filed June 18, 1930
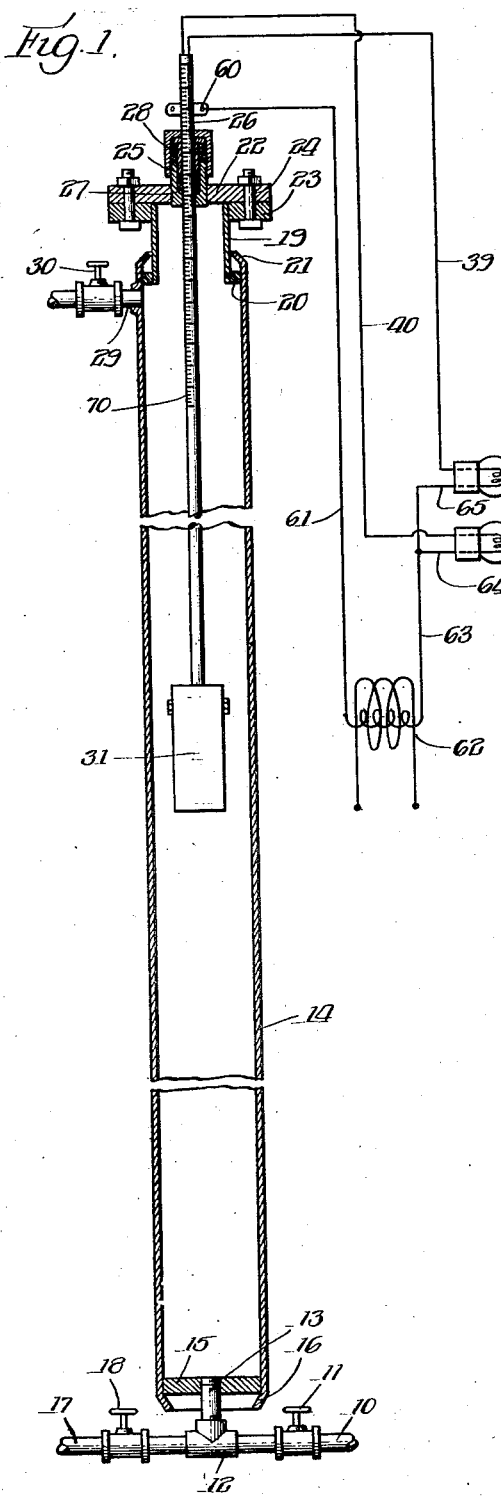
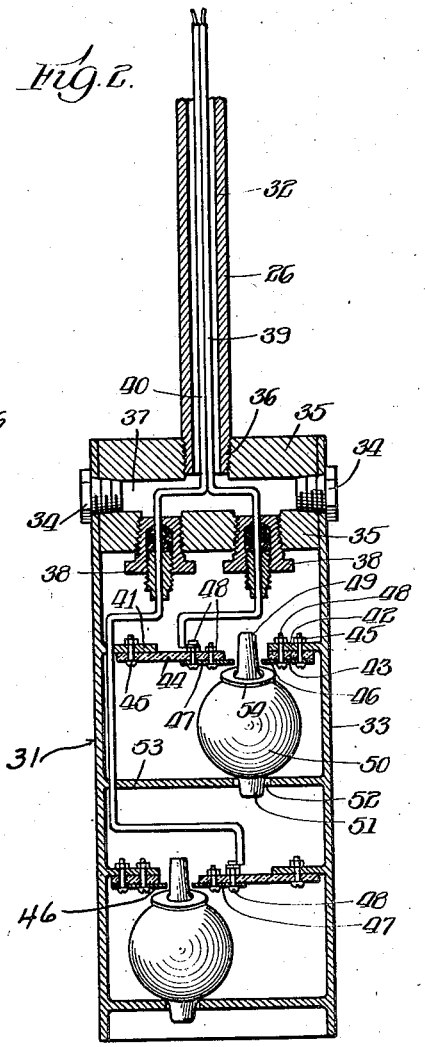
Inventor:
Herman B. Siems,
By Wilkinson, Huxley, Byron & Knight
attys.

Patented Oct. 11, 1932

1,882,196

UNITED STATES PATENT OFFICE

HERMAN B. SIEMS, OF CHICAGO, ILLINOIS, ASSIGNOR TO SWIFT & COMPANY, OF CHICAGO, ILLINOIS, A CORPORATION OF ILLINOIS

DEVICE FOR MEASURING LIQUIDS

Application filed June 18, 1930. Serial No. 461,936.

This invention relates to a novel measuring device for liquids, adapted for measuring batches or predetermined quantities of liquids while under pressure and especially useful for measuring liquids which assume a gaseous state at ordinary temperatures and pressures.

The device of this invention, is also useful as a part of a closed system in which liquids are handled and may be mounted permanently or otherwise, whereby liquids under pressure may be supplied to the device and drawn therefrom in definite, known and measured quantities.

As this measuring device is completely closed, it is obvious that it may be used with various substances, particularly those which are stored or shipped under pressure, to maintain them in liquid form.

This invention has been successfully used for measuring anhydrous ammonia ($NH_3$) in connection with the manufacture of fertilizer, but this particular use is mentioned merely by way of illustration and is not intended to limit the invention in any respect.

In measuring substances which exist as liquids at ordinary temperatures and pressures, no particular difficulty is encountered, but accurate measurements of substances which are apt to boil or gasify under ordinary conditions, are difficult to obtain unless the pressure is raised to that point at which existence of the substance in liquid form is assured. With different substances, different pressures are required, some of which are quite high, and all of which are greater at more elevated temperatures.

Under pressure conditions, means such as sight gauges formed of glass tubes, now in common use, are not suitable for satisfactory results, due to the fact that with substances such as anhydrous ammonia, they are quite dangerous in view of their liability of breaking under exposure to pressure with great danger to the operator and furthermore, due to the fact that the interiors of such relatively small glass tubes are usually at a higher temperature, they cause a boiling or frothing of the liquid therein which renders it practically impossible to obtain an accurate reading of the liquid level.

It is therefore an object of the present invention to provide a measuring device capable of use with liquids under pressure and as a part of the closed system which is simple in construction and is productive of very accurate metering by a simple manual operation.

It is a further object of this invention, to provide a device, the construction of which is particularly adapted for the measuring of substances such as anhydrous ammonia in a closed system where the ammonia is maintained under pressure in liquid form.

It is a further object of this invention to provide in a device of the above described character, means whereby the particular quantity to be measured, can be varied at will and in which indicating signals are employed for denoting the level of liquid, including a preliminary warning signal and a final signal for the exact predetermined quantity.

A further object is to provide a measuring device which may be controlled from a remote location if desired, or one in which the signal means may be located in any desired and convenient place, so that perfect visibility may be had while operating the device.

These and other objects not specifically enumerated, are contemplated for this invention, as will readily appear to one skilled in the art as the following description proceeds with reference to the accompanying drawing, in which Figure 1 is an elevational view in cross section showing a measuring device constructed in accordance with this invention, and Figure 2 is an enlarged cross sectional view of the float contact mechanism.

By referring to the drawing, it will be noted that the present invention is illustrated as embodied in a measuring device which is attached to a pipe line 10, having a valve 11, by means of the T, 12, and connecting pipe 13. The measuring device comprises an elongated cylinder 14, disposed in vertical position having its bottom closed by means of the plate 15, held and sealed by the clinched end 16, of the cylinder.

Connected with the T-connection 12, is an outlet pipe 17, which is provided with a control valve 18. The upper end of the cylinder is closed by means of the upstanding sleeve 19 and ring 20, which are mounted as shown in the drawing and held by the clinched end 21 of the cylinder 14. Secured on the upper end of the sleeve 19, is a closing plate 22, and collar 23, secured by bolts 24, in a manner to seal and close the upper end thereof.

At the central location of the plate 22, a stuffing box 25 is provided through which a tube 26 is slidably mounted. The stuffing box is provided with suitable packing 27, and gland 28, so that a tight seal is provided for preventing the escape of gases from the cylinder.

Adjacent the upper end of the cylinder an outlet pipe 29 is provided, having a control valve 30, which under ordinary circumstances, is kept closed but which may be used to release the pressure within the metering cylinder when desired.

It will be noted from Figure 1, that the tube 26 which is slidably mounted in the gland, is held supported thereby in a depending relationship into the central portion of the cylinder and that on the end thereof, a float contact mechanism 31 is attached. The details of this mechanism are shown in Figure 2.

It will be noted from Figure 2, that the tube 26 is provided with a central opening 32 for the purpose of accommodating electric contact wires as hereinafter more fully described.

Referring now to Figure 2, the float contact mechanism comprises a frame piece 33, which is supported by means of the screws 34, from the bracket 35. The bracket is held on the end of the tube 26, by screw thread engagement as at 36 therewith or other suitable attaching means. The bracket 35 is provided with a cavity 37, which is sealed from the interior of the cylinder at the location of the screw thread 36, and attaching screws 34, and also by means of the packing glands 38, which provide openings for the electric contact wires 39 and 40.

The sealed condition of the cavity 37 prevents the escape of gas and release of pressure through the central channel 32 of the tube 26.

Below the level of the packing glands, opposed projections 41 and 42 are provided, which serve as mountings for the insulating material 43 and 44 secured thereto by means of bolts 45.

Electric contact plates 46 and 47 are mounted by bolts 48, on the insulating material 43 and 44 respectively, in a manner to present spaced, opposed ends adapted to accommodate the upper projecting end 49, of the spherical float 50. This float is provided with a projecting end 51 at its opposite side which fits in an opening 52, in the frame partition 53, all as shown in Figure 2.

Surrounding the upper projection 49 of the float and resting on the shoulder of the spherical portion thereof, is a platinum contact collar 54, which is adapted to establish electric connection between the contacts 46 and 47 when the float is in raised position. From this construction, it will be observed that the float is confined by the guiding influence of the projections 49 and 51 and the hole 52, so as to be constrained to a vertical movement imparted to it by the floating action as the liquid rises and lowers in the cylinder.

Below the level of the float contact device just described, a second contact mechanism of similar construction is provided which will not be again described, as the parts are exactly the same.

It will be noted, that the wire 40, is brought down and connected to the bolt 48, and contact plate 47, of the lower float contact whereas the wire 39, is connected to the bolt 48 and contact plate 47, of the upper float contact. The other contact plates 46 of the upper and the lower float devices, are connected electrically, by means of the bolts, to the frame piece 33, which is electrically connected through the bracket 35, with the tube 26.

At the upper end of the tube on the exterior of the cylinder, a contact plate 60 is mounted on the tube which serves to connect the tube electrically with the wire 61, which is in turn, connected to one end of a source of power 62. The other end of the source of power has a wire 63, connected thereto which is connected by wires 64 and 65, to one terminal of each of the indicator signal lights 66 and 67.

For the purpose of differentiation, one of these lights may be of one color and the other of a contrasting color such as for instance, red and green, whereby the indicated information may be readily ascertained.

Wire 40, which extends from the lower float contact, extends up through the tube and connects with the other terminal of the light 66, and the wire 39 is disposed likewise and connects with the second terminal of the light 67. The tube 26 adjacent the upper end thereof, is preferably provided with a graduated scale 70, marked on its surface, whereby the tube by vertical adjustment can be readily positioned with accuracy in a manner to locate the float contacts to indicate the desired predetermined quantity of liquid in the cylinder.

If it is undesirable to graduate the surface of the tube, it is contemplated that a marking arrow, or other pointer, be mounted on the upper end of the tube with a graduated scale mounted behind the tube in indicating association with the pointer.

Referring more particularly to the construction of the floats 50, in practice, these are made of glass, of a particular size, strength and air capacity to perform the floating function in the particular medium with which it is to be used and to withstand the pressure within the tube. By forming the floats of glass, as described, it has been found that they can be made of a strength to withstand the pressure to which they are subjected when measuring anhdyrous ammonia and also serves to enclose that quantity of air which is sufficient to give the proper buoyancy when placed in liquid ammonia.

In operation it is contemplated that the pipe 10, be connected to a source of anhydrous ammonia under pressure sufficient to maintain it in liquid form and that upon desiring to obtain a measured quantity thereof, the tube 26 is adjusted vertically according to the indicating scale 70 in a manner to locate the float contact mechanism in the proper position to measure the quantity desired.

With the parts so adjusted, the valve 11 is opened and the valve 18 is kept closed, so that the liquid is free to enter the cylinder from the bottom at a rate determined by the degree of opening of the valve 11.

It is preferable for the operator to select a feeding rate which will permit him to readily shut off or substantially reduce the feed in a relatively short period, as when warned by the lighting of the warning light 66. As the liquid level rises, in the cylinder, it finally comes up to the level of the lower float contact 50, causing it to float and rise on the surface of the liquid until electric contact is made, lighting the signal light 66. Upon receiving this warning signal, the operator immediately reduces the speed of the feed to a very slow rate, which can be shut off in an instant, and then continues to feed in this manner while watching intently, the signal light 67.

As the level continues to rise, the float 50, is finally elevated and makes its contact thereby lighting the signal light 67, at which instant the operator shuts offs the feed entirely.

By this process, it will be observed that a predetermined measured quantity of the liquid under pressure is contained in the cylinder which may then be discharged by opening the valve 18, permitting the liquid to pass out through the pipe 17. This process may be repeated over and over again with a high degree of accuracy and without delay or undue care.

It will appear from the above description, that the process and apparatus lends itself well as a unit of a closed system whereby liquids under pressure may be accurately measured and discharged from the device without being removed from the system or in any way having the pressure reduced or otherwise altered.

It will also appear that the device may be controlled from a remote location if such is desirable and also that the indicating mechanism, namely, the lights, may be placed in any convenient and plainly visible locality.

By locating the lights directly in front of the operator and providing the control valves in a readily accessible position, it will be obvious that the measuring operation is greatly facilitated and the degree of accuracy in handling, is correspondingly promoted.

As above mentioned, the apparatus has been found to serve well in measuring anhydrous ammonia which is conveyed and transported under that degree of pressure which is required to maintain it in liquid form under the temperature conditions to which it is subjected.

The present disclosure is given merely by way of example and is not to be considered as limiting the invention in any respect, as the scope of the invention may be determined from the appended claims and an understanding of the disclosure with an appreciation of the advantages which the invention produces therein.

I claim:

1. A device for measuring liquids under pressure, comprising in combination, a sealed container adapted to hold liquid under pressure, valved inlet and outlet means at the bottom of said container, and means within said container adapted for actuation by liquid in predetermined relationship thereto, and means outside of said container responsive to the actuation of said last named means.

2. A metering device of the character described comprising in combination, a vertically disposed sealed cylinder adapted to hold liquid under pressure having valved inlet and outlet means at the bottom thereof, and float means vertically adjustable within said cylinder, having electrical contacts adapted to close a circuit when said float means is in elevated position, and an electrically responsive indicating device exteriorly of said cylinder, connected for operation by said float means.

3. In a metering device of the character described, the combination of a sealed container adapted to hold liquid under pressure, having valved liquid inlet and outlet means at the bottom thereof and a pair of indicators exteriorly of said container and a pair of float means in said container, one disposed for actuating one of said indicators when liquid is at one level and the other disposed for actuating the other of said indicators when the liquid is at a higher level.

4. A metering device of the character described, comprising in combination, a vertically disposed sealed cylinder adapted to hold liquid under pressure, having valved inlet and outlet means at the bottom thereof, a pair of electrically responsive indicating means exteriorly of said cylinder, and vertically adjustable means within said cylinder having float actuating contacts one above the other, and each adapted to actuate one of said indicators and means connecting said contacts and indicators.

5. A metering device of the character described, comprising in combination, a vertically disposed sealed cylinder adapted to hold liquid under pressure, having valved inlet and outlet means at the bottom thereof, a pair of electrically responsive indicating means exteriorly of said cylinder, and vertically adjustable means within said cylinder having float actuating contacts one above the other, and each adapted to actuate one of said indicators and means connecting said contacts and indicators and a graduated scale exteriorly of said cylinder adapted to show the position of said vertically adjustable means with respect to said cylinder.

6. A metering device of the character described, comprising a sealed container adapted to hold liquid under pressure having an elongated tube slidably mounted through the top wall thereof, an electrical contact float mechanism in said container carried by the end of said tube and having electrical connections extending to the exterior through said tube, and electrically responsive indicating mechanism connected to said connections.

7. A metering device of the character described, comprising a sealed container adapted to hold liquid under pressure having an elongated tube slidably mounted through the top wall thereof, an electrical contact float mechanism in said container carried by the end of said tube and having electrical connections extending to the exterior through said tube, and electrically responsive indicating mechanism connected to said connections, said tube having graduated markings thereon indicative of the quantity of liquid required to influence said float mechanism for various adjusted positions of said tube.

8. In a metering device of the character described, the combination of a container adapted to hold anhydrous ammonia under liquefying pressure, electrical responsive means located externally of said container for indicating the liquid level in said container, electrical connections for said last-named means and a contact switch therefor located in said container comprising a sealed hollow glass float having strength sufficient to withstand the pressure in said container and buoyancy to float on liquefied anhydrous ammonia.

9. In a metering device of the character described, the combination of a container adapted to hold anhydrous ammonia under liquefying pressure, electrical responsive means located externally of said container for indicating the liquid level in said container, electrical connections for said last-named means and a contact switch therefor located in said container comprising a sealed hollow glass float having strength sufficient to withstand the pressure in said container and buoyancy to float on liquefied anhydrous ammonia while supporting an electrical conducting element for said switch.

10. In a metering device of the character described, the combination of a container adapted to hold anhydrous ammonia under liquefying pressure, electrical responisve means located externally of said container for indicating the liquid level in said container, electrical connections for said last-named means and a contact switch therefor located in said container comprising a sealed hollow glass float having strength sufficient to withstand the pressure in said container and buoyancy to float on liquefied anhydrous ammonia while supporting a platinum contact element for said switch.

Signed at Chicago, Illinois, this 11th day of June, 1930.

HERMAN B. SIEMS.